US008989970B2

(12) United States Patent
Murray

(10) Patent No.: US 8,989,970 B2
(45) Date of Patent: Mar. 24, 2015

(54) CONTINUOUSLY VARIABLE RATIO TRANSMISSION ASSEMBLY AND METHOD OF CONTROL OF SAME

(75) Inventor: Stephen William Murray, Grimsargh (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 1569 days.

(21) Appl. No.: 10/564,684

(22) PCT Filed: Jun. 3, 2004

(86) PCT No.: PCT/GB2004/002376
§ 371 (c)(1),
(2), (4) Date: Jul. 6, 2006

(87) PCT Pub. No.: WO2005/015060
PCT Pub. Date: Feb. 17, 2005

(65) Prior Publication Data
US 2007/0142163 A1    Jun. 21, 2007

(30) Foreign Application Priority Data
Jul. 12, 2003 (GB) .................................. 0316382.1

(51) Int. Cl.
*F16H 61/00* (2006.01)
*F16H 61/06* (2006.01)
(Continued)

(52) U.S. Cl.
CPC ................ *F16H 61/06* (2013.01); *F16H 59/48* (2013.01); *F16H 61/6648* (2013.01); *G01P 15/165* (2013.01); *G01P 21/00* (2013.01); *F16H 61/664* (2013.01)
USPC ................... 701/51; 701/53; 701/54; 701/55; 701/56; 475/42; 475/43; 475/44; 475/120; 475/121; 475/122; 475/125; 475/126; 475/127; 475/207; 475/208; 475/210; 475/254; 475/257; 475/266; 477/44; 477/45; 477/46; 477/48; 477/49

(58) Field of Classification Search
CPC ............ F16H 61/0021; F16H 61/0206; F16H 61/0251; F16H 61/0262; F16H 61/0267; F16H 61/06; F16H 61/061
USPC ................ 701/51, 53–56; 475/207, 208, 210, 475/42–44, 120–122, 125–127, 254, 257, 475/266; 474/8, 11, 28; 477/44–46, 48, 49
See application file for complete search history.

(56) References Cited
U.S. PATENT DOCUMENTS 4,579,021 A * 4/1986 Yamamuro et al. ............. 477/45
5,012,417 A   4/1991 Watanabe et al.
(Continued)

FOREIGN PATENT DOCUMENTS

DE    43 28 893 A1    3/1994
DE    198 10 213 A1   9/1999
(Continued)

OTHER PUBLICATIONS

PCT International Preliminary Report on Patentability for PCT/GB2004/002376 mailed Jan. 16, 2006, 6 pages.
(Continued)

*Primary Examiner* — Jack W Keith
*Assistant Examiner* — Chuong P Nguyen
(74) *Attorney, Agent, or Firm* — Blakely Sokoloff Taylor & Zafman LLP

(57) ABSTRACT

There is disclosed a continuously variable ratio transmission assembly ("variator") comprising a roller which transmits drive between a pair of races, the roller being movable in accordance with changes in variator ratio, a hydraulic actuator which applies a biasing force to the roller, at least one valve connected to the actuator through a hydraulic line to control pressure applied to the actuator and so to control the biasing force, and an electronic control which determines the required biasing force and sets the valve accordingly, wherein the valve setting is additionally dependent upon a rate of flow in the hydraulic line.

15 Claims, 9 Drawing Sheets

(51) Int. Cl.
  *F16H 59/48* (2006.01)
  *F16H 61/664* (2006.01)
  *G01P 15/16* (2013.01)
  *G01P 21/00* (2006.01)

(56) References Cited

U.S. PATENT DOCUMENTS

| | | | |
|---|---|---|---|
| 5,123,714 A | 6/1992 | Mori | |
| 5,232,406 A * | 8/1993 | Sato | 474/28 |
| 5,334,102 A * | 8/1994 | Sato | 474/18 |
| 5,395,292 A * | 3/1995 | Fellows et al. | 476/10 |
| 5,402,345 A | 3/1995 | Kost | |
| 5,425,574 A | 6/1995 | Sano | |
| 5,579,230 A | 11/1996 | Lin et al. | |
| 5,615,933 A | 4/1997 | Kidston et al. | |
| 5,669,845 A | 9/1997 | Muramoto et al. | |
| 5,706,196 A | 1/1998 | Romstadt | |
| 5,873,639 A | 2/1999 | Takahashi et al. | |
| 5,938,557 A * | 8/1999 | Greenwood | 475/216 |
| 5,967,931 A * | 10/1999 | Hoge et al. | 475/216 |
| 6,071,209 A | 6/2000 | Greenwood | |
| 6,086,505 A * | 7/2000 | Sakai | 476/10 |
| 6,202,780 B1 | 3/2001 | Tanaka et al. | |
| 6,349,255 B1 | 2/2002 | Heckmann | |
| 6,370,459 B1 | 4/2002 | Phillips | |
| 6,409,625 B1 * | 6/2002 | Sakai et al. | 475/208 |
| 6,614,343 B1 | 9/2003 | Fennel et al. | |
| 6,629,025 B2 * | 9/2003 | Evans et al. | 701/22 |
| 6,697,611 B1 | 2/2004 | Franca-Neto | |
| 7,056,261 B2 * | 6/2006 | Fuller | 477/37 |
| 7,128,688 B2 * | 10/2006 | Katou | 477/98 |
| 7,318,786 B2 * | 1/2008 | Greenwood et al. | 476/10 |
| 8,489,299 B2 | 7/2013 | Murray | |
| 2002/0036429 A1 | 3/2002 | Shimada et al. | |
| 2002/0075142 A1 | 6/2002 | Foo et al. | |
| 2002/0075143 A1 | 6/2002 | Foo et al. | |
| 2002/0099490 A1 | 7/2002 | Wakamatsu et al. | |
| 2003/0058118 A1 | 3/2003 | Wilson | |
| 2003/0141128 A1 | 7/2003 | Hessmert et al. | |
| 2003/0158648 A1 | 8/2003 | Kubota et al. | |
| 2004/0166824 A1 | 8/2004 | Franca-Neto | |
| 2004/0171451 A1 * | 9/2004 | Fuller | 475/115 |
| 2004/0176899 A1 | 9/2004 | Hallowell | |
| 2004/0199300 A1 | 10/2004 | Gustafsson et al. | |
| 2004/0235595 A1 * | 11/2004 | Luh | 474/8 |
| 2005/0000305 A1 | 1/2005 | Yamada et al. | |
| 2005/0079947 A1 * | 4/2005 | Fukuyama et al. | 476/10 |
| 2006/0074558 A1 | 4/2006 | Williamson et al. | |
| 2009/0005914 A1 * | 1/2009 | Demarco et al. | 700/282 |
| 2009/0123009 A1 | 5/2009 | Roeck et al. | |
| 2013/0123061 A1 * | 5/2013 | Fuller | 476/9 |

FOREIGN PATENT DOCUMENTS

| | | | |
|---|---|---|---|
| DE | 101 22 653 A1 | 7/2002 | |
| DE | 10164490 A1 * | 7/2003 | F16H 61/02 |
| EP | 0444086 | 1/1993 | |
| EP | 0 832 376 B1 | 1/1999 | |
| EP | 1 013 523 A2 | 6/2000 | |
| EP | 1 085 312 A2 | 3/2001 | |
| EP | 1 099 884 A2 | 5/2001 | |
| EP | 1 099 884 A3 | 5/2001 | |
| JP | 61-189432 | 8/1986 | |
| JP | 62-005184 | 1/1987 | |
| JP | 82-70772 | 10/1996 | |
| JP | 2001-108579 | 4/2001 | |
| JP | 2001-141013 | 5/2001 | |
| WO | WO 97/01718 | 1/1997 | |
| WO | WO 99/46604 | 9/1999 | |
| WO | WO-02/088577 A1 * | 11/2002 | F16H 61/38 |
| WO | WO 02/099317 A1 | 12/2002 | |
| WO | WO 2004/085190 A1 | 10/2004 | |

OTHER PUBLICATIONS

PCT International Search Report for PCT/GB2004/002376 mailed Aug. 25, 2004, 2 pages.
PCT Written Opinion for PCT/GB2004/002376, 5 pages.
JP Search Report for related Japanese Application No. 2006-519983, mailed Jan. 21, 2010.
PCT Notification of International Preliminary Report on Patentability for PCT Application No. PCT/GB2004/002348, 7 pgs. (Jan. 16, 2006).
First Office Action for Chinese Patent Application No. 200480019868.0, 7 pgs. (Feb. 29, 2008).
Second Office Action for Chinese Patent Application No. 200480019868.0, 4 pgs. (Oct. 13, 2008).
Notice of Registration for Chinese Patent Application No. 200480019868.0, 3 pgs. (Jun. 19, 2009).
Examination Report for Great Britain Patent Application No. GB 0600395.8, 1 page (Jun. 27, 2006).
Office Action for German Patent Application No. 11 2004 001 278.3, 5 pgs. (Oct. 22, 2012).
Notice of Reason for Refusal for Japanese Patent Application No. 2006-519982, 5 pgs. (Aug. 11, 2010).
Decision of Rejection for Japanese Patent Application No. 2006-519982, 2 pgs. (Jun. 3, 2011).
PCT Notification of Transmittal of The International Search Report and The Written Opinion of the International Searching Authority, or The Declaration for PCT Counterpart Application No. PCT/GB2004/002348, Containing International Search Report 13pgs. (Sep. 13, 2004).

* cited by examiner

CONTINUOUSLY VARIABLE RATIO TRANSMISSION ASSEMBLY AND METHOD OF CONTROL OF SAME

TECHNICAL FIELD

This is a National Phase of International Application No. PCT/GB2004/002376, filed on Jun. 3, 2004, which claims priority from Great Britain Patent Application No. 0316382.1, filed on Jul. 12, 2003.

RELATED APPLICATIONS

The present invention is concerned with a continuously variable ratio transmission assembly ("variator") and with a method of control of same.

BACKGROUND

Variators for use in motor vehicle transmissions are widely known. The present invention is particularly applicable to variators of the type sometimes referred to as "torque controlled". The principle upon which they operate is known e.g. from Torotrak's earlier patents (including U.S. Pat. No. 5,395,292 and its European counterpart EP444086) but can briefly be summarised as follows. Whereas more conventional "ratio controlled" variators receive a control input which corresponds to a chosen variator drive ratio (determined by an associated electronic control) and are constructed such as to automatically adjust to provide the chosen ratio, a torque controlled variator instead receives a control input corresponding to chosen torques at the variator input/output. Looking at the specific example of the toroidal-race, rolling-traction type variator described in the aforementioned Torotrak patents, the variator's control input directly determines the "reaction torque" which is the sum of the variator's input and output torques. The actual variator ratio is not directly determined by the control input to the variator. Instead it results from the acceleration/deceleration of the engine and vehicle resulting from the torques respectively exerted thereupon by the variator input and output shafts.

The control input to this type of variator conventionally takes the form of a difference between two hydraulic pressures. By acting on opposed piston faces the two pressures create an adjustable force upon components of the variator (typically in the form of rollers) which in turn serve to create the reaction torque. A pair of hydraulic valves is used to control the two hydraulic pressures. In the associated electronic controller, a requirement for variator reaction torque is converted into a requirement for the two pressures and so into control signals passed to the two valves. Hence the electronic controller has direct control over variator reaction torque.

While the variator ratio is constant, and no flow of fluid takes place between the hydraulic valves and the variator pistons, the hydraulic pressures acting upon the variator pistons are equal to the pressures output from the respective hydraulic valves. However the inventors have recognised that when variator ratio changes, with consequent flow in the hydraulics connecting the valves to the pistons, a pressure drop in the lines along the direction of flow inevitably results. The pressures exerted upon the variator pistons are therefore not the same as the pressures output from the hydraulic valves. The result can be a deviation of the reaction torque from the required value.

The problem is exacerbated because the hydraulics typically incorporate some form of hydraulic damper intended to create a pressure drop in response to fluid flow, thereby to reduce unwanted oscillatory behaviour of the variator itself. The damper contributes to the pressure drop. Through flow of fluid can also prevent the valves from creating the demanded pressures.

SUMMARY

In accordance with a first aspect of the present invention there is a continuously variable ratio transmission assembly ("variator") comprising a roller which transmits drive between a pair of races, the roller being movable in accordance with changes in variator ratio, a hydraulic actuator which applies a biasing force to the roller, at least one valve connected to the actuator through a hydraulic line to control pressure applied to the actuator and so to control the biasing force, and an electronic control which determines the required biasing force and sets the valve accordingly, characterised in that the valve setting is additionally dependent upon a rate of flow in the hydraulic line.

By setting the valve in dependence upon flow rate in the hydraulics, pressure changes due to such flow can be compensated for.

In an especially preferred embodiment, the control electronics serve to determine the rate of flow in the hydraulic line, to determine a consequent pressure change between the actuator and the valve, and to adjust the valve setting to compensate for the pressure change.

In this way the electronic control is enabled to provide the desired biasing force even while variator ratio change is taking place. In the case of a torque controlled variator, it is thus possible to reliably provide a desired reaction torque.

In a preferred embodiment the electronic control calculates the pressure change from the rate of flow and the characteristics of one or more components of the hydraulic line.

The component characteristics may be stored in look up tables of the electronic control. Alternatively a mathematical model may be used in this connection. Typically the table or model provides the pressure drop created by the component in response to flow through it. The direction of this pressure drop depends of course upon the direction of fluid flow. Its effect may be to increase or to decrease pressure at the variator pistons. Allowance may also be made for variation of pressure drop with fluid viscosity and/or temperature.

In a torque controlled variator of the toroidal-race, rolling-traction type, flow rate in the hydraulic line connecting the valve to the actuator is a function of rate of change of variator ratio, and also of the variator ratio, and can be calculated from these quantities. Note however that these quantities are not directly controlled by the electronics and so must themselves be calculated or measured. To base pressure compensation upon measured variator ratio could render the variator unstable due to feedback of unwanted oscillation and/or reduction in damping from the hydraulics.

According to a particularly preferred embodiment of the present invention, the electronic control takes account, in calculating the rate of flow, of predicted values of engine speed and engine acceleration.

Of course engine speed is related to variator input speed and so relates to variator ratio. Feedback problems related to engine speed can be avoided by use of predicted, rather than directly measured, values thereof.

Preferably, the hydraulic line incorporates at least one component serving to create a pressure change in response to flow and thereby to damp oscillation of the variator roller, and by virtue of the compensation to the valve setting based upon predicted engine speed and engine acceleration the effect of the valve and the component together is to damp deviations of roller position from those corresponding to the predicted engine speed. The component in question is preferably a hydraulic damper. However any component which provides a constricted cross section for fluid flow can serve this purpose.

In a further preferred embodiment, in calculating the rate of flow, the electronic control takes account of vehicle speed and vehicle acceleration.

From vehicle speed/acceleration, the variator's output speed and the rate of change thereof can be found. Again there are however potential problems if measured vehicle speed is used in calculation of flow, since low frequency vehicle/drive oscillations could thereby be fed back in a manner leading to instability.

In a particularly preferred embodiment of the present invention, in determining the value of vehicle acceleration used in calculating the rate of flow, the control electronics take account of net force applied to drive the vehicle.

Preferably, net force applied to drive the vehicle is used to obtain a first vehicle acceleration signal which is high pass filtered, measurement of vehicle speed or acceleration is used to obtain a second vehicle acceleration signal which is low pass filtered, and the first and second signals are then added together to provide an improved vehicle acceleration signal used in calculating the rate of flow.

There is also the problem of obtaining a usable value of vehicle speed (or equivalently variator output speed) for use in calculating the flow in the hydraulics, given that a measured value of vehicle speed is subject to low frequency oscillation and also signal noise.

In still another preferred embodiment, a measured vehicle speed is low pass filtered and an offset is added to the filtered signal to compensate for time lag caused by the filtering.

A second, more general, problem has been addressed by the present inventors. This relates to the determination of vehicle acceleration. A vehicle acceleration signal is required, both for the above described pressure compensation and for other reasons, which is filtered to remove low frequency oscillation (due e.g. to oscillations in vehicle suspension and drive line) but which does not lag unacceptably behind the true vehicle acceleration.

In accordance with a second aspect of the present invention there is a method of determining acceleration of a motor vehicle, comprising determining net force applied to drive the vehicle, calculating therefrom an estimate of vehicle acceleration and high pass filtering to provide a first signal, measuring vehicle acceleration, low pass filtering the measured vehicle acceleration to provide a second signal and adding the first and second signals to provide an output signal representing vehicle acceleration.

Vehicle acceleration could perhaps be measured using some form of accelerometer. Preferably, however, the "measured" value is obtained by measuring vehicle speed and differentiating with respect to time.

The calculation of vehicle acceleration from net driving force preferably comprises among other operations subtraction of estimated vehicle drag and division by an estimated vehicle mass.

A more sophisticated approach involves allowance for road gradient, changes in vehicle mass, brake force etc. An adaptive vehicle mass and gradient model is preferably incorporated.

In accordance with a third aspect of the present invention there is a method of obtaining a signal representing a physical quantity, comprising measuring the quantity to provide a raw measured signal, low pass filtering the signal to provide a filtered signal and adding an offset to the filtered signal to provide an output signal representing the physical quantity, the offset being obtained by differentiating the filtered signal with respect to time and multiplying by a constant.

BRIEF DESCRIPTION OF THE DRAWINGS

Specific embodiments of the present invention will now be described, by way of example only, with reference to the accompanying drawings in which.

DETAILED DESCRIPTION

Figure 1:
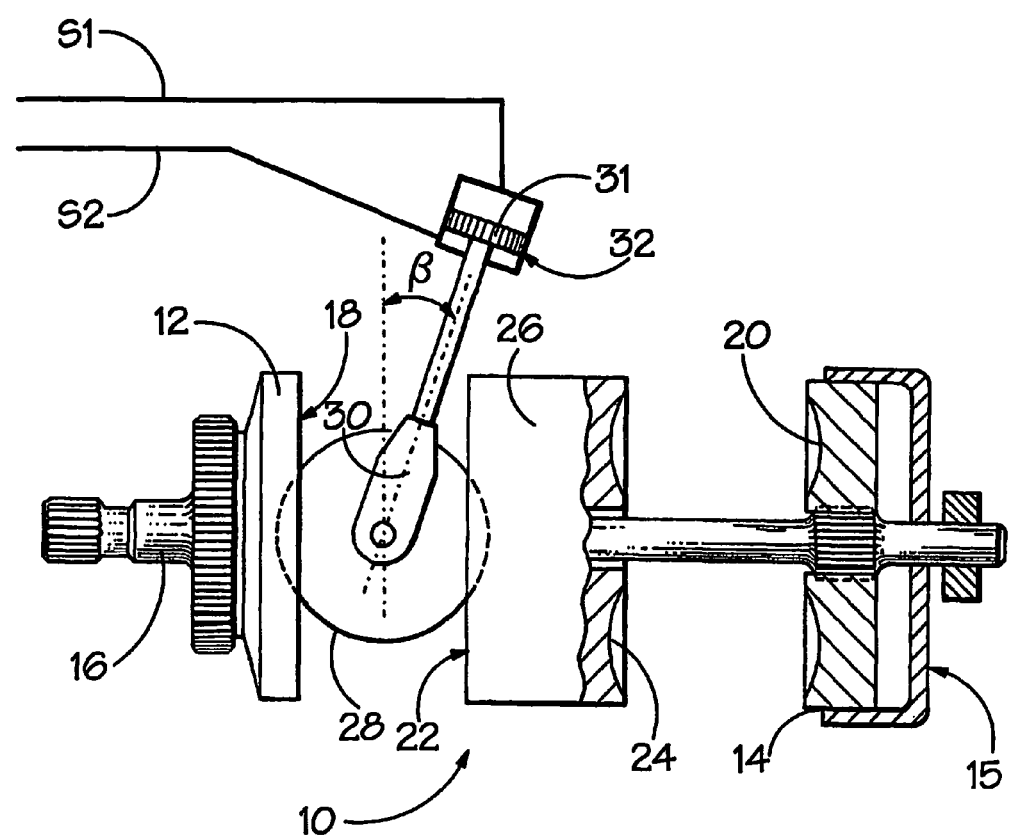
FIG. 1 is a highly simplified, partly sectional illustration of some major components of a toroidal-race, rolling-traction type variator.

The variator construction illustrated in FIG. 1 is in itself known. The drawing shows a variator 10 of the "full toroidal" type. Here, two input discs 12, 14 are mounted upon a drive shaft 16 for rotation therewith and have respective part toroidal surfaces 18, 20 facing toward corresponding part toroidal surfaces 22, 24 formed upon a central output disc 26, two toroidal cavities being thus defined between the discs. The output disc is journalled such as to be rotatable independently of the shaft 16. Drive from an engine or other prime mover, input via the shaft 16 and input discs 12, 14, is transferred to the output disc 26 via a set of rollers disposed in the toroidal cavities. Alternatively drive may be transmitted in the opposite direction, from the disc 26 to discs 12, 14. A single representative roller 28 is illustrated but typically three such rollers are provided in each cavity. An end load applied across the input discs 12, 14 by a hydraulic end load arrangement 15 provides pressure between rollers and discs to enable the transfer of drive. Drive is taken from the output disc to further parts of the transmission, typically including an epicyclic mixer, as will be explained below. Each roller is journalled in a respective carriage 30 which is itself coupled to a hydraulic actuator 32 whereby an adjustable translational force can be applied to the roller/carriage combination. As well as being capable of translational motion the roller/carriage combination is able to rotate about the axis of a piston 31 of the actuator 32 to change the "tilt angle" of the roller and to move the contacts between rollers and discs, thereby allowing variation in the variator transmission ratio, as is well known to those skilled in the art.

The illustrated variator is of the torque-controlled type. The hydraulic actuator 32 exerts a controlled force upon the roller/carriage assembly and this force is balanced, in equilibrium, by the sum of (1) the force exerted by the input disc 12 upon the roller and (2) the force exerted by the output disc 26 upon the roller. The three forces can equally-well be regarded as creating torques tending to urge the roller along a circular path about the variator axis. One can then say that the sum of the torques acting upon the input and output discs of the variator is equal to the torque exerted by the actuator 32, and is consequently proportional to the pressure difference across the piston 31. This quantity the sum of the input and output torques is referred to as the reaction torque. By controlling the pressures applied to the piston 31, the reaction torque can itself be directly controlled.

The drive ratio provided by the variator is consequently not directly controlled. Instead, changes in speed of the variator input and output result from application of the input and output torques created by the variator to the inertias coupled to the input and output. On the input side the torque created by the variator is added to the torque created by the engine in determining engine acceleration. The variator's output torque is of course applied to the driven wheels and serves to accelerate the vehicle. As changes in variator input and output speed take place, the roller automatically moves and precesses to a position providing the necessary variator ratio.

Figure 2:
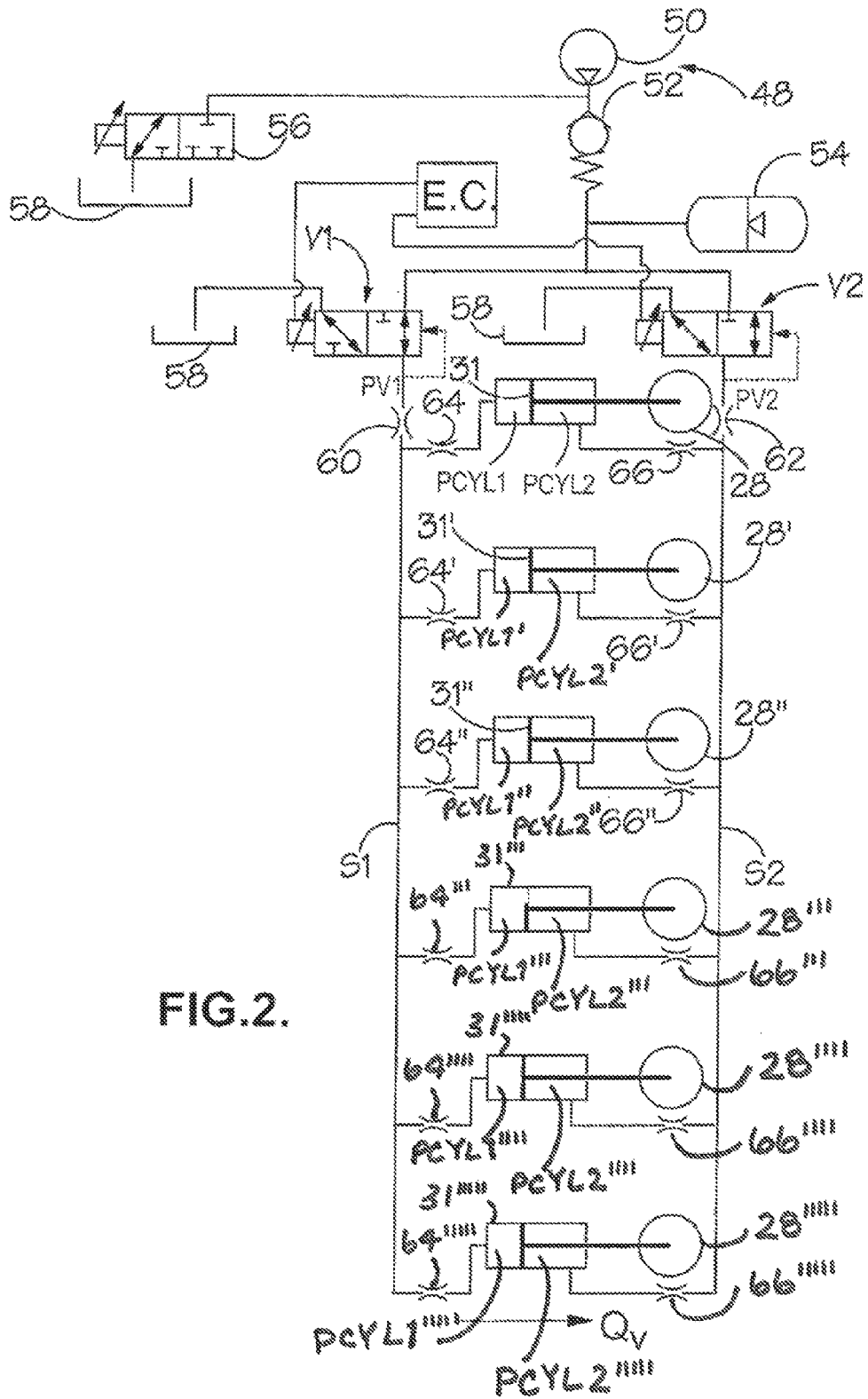
FIG. 2 is a schematic illustration of a hydraulic variator control circuit.
Figure 3A:
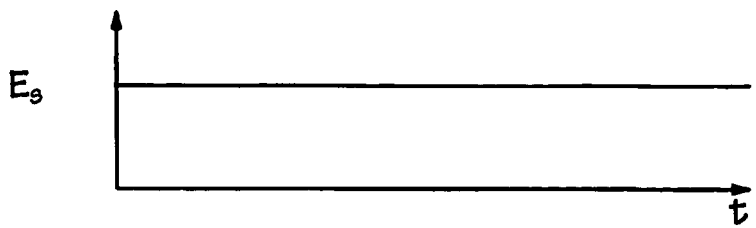
FIG. 3 (a)-(e) are graphs of changes in certain vehicle variables over time.
Figure 3B:
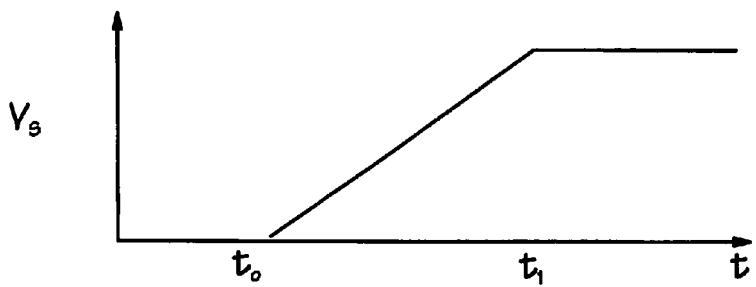
Figure 3C:
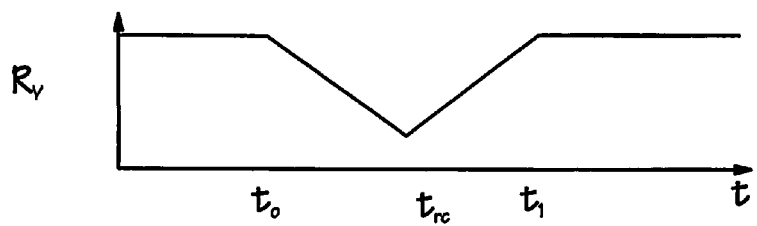
Figure 3D:
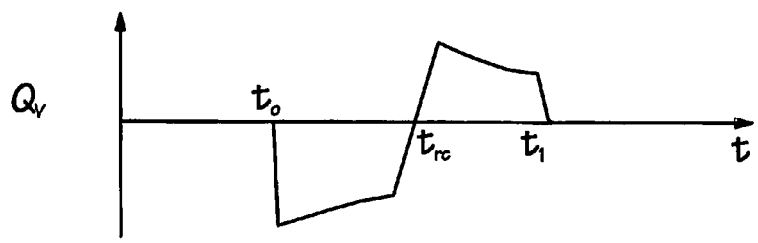
Figure 3E:
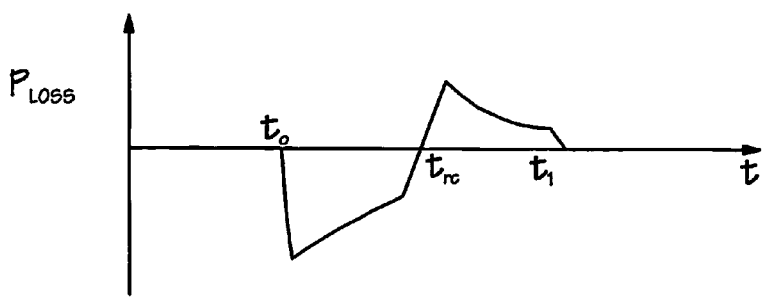

The main control input to the illustrated variator thus takes the form of the pressure difference in lines S1, S2 leading to opposite sides of the piston 31. FIG. 2 illustrates a hydraulic circuit for controlling the variator. In this drawing the variator rollers 28, 28' . . . and their associated pistons 31, 31' . . . are indicated in a highly schematic format. They can be seen to be fed from the hydraulic lines S1, S2. A high pressure supply 48 is provided, comprising a pump 50 which is connected via a non-return valve 52 to a pressure accumulator 54 and is also connected to a charge control valve 56 which diverts the pump's output when necessary, the resulting output being at a stable high pressure. This output is led to a pair of pressure control valves V1, V2 which respectively control pressures applied to the hydraulic lines S1, S2. Each valve has a state in which it connects its line V1, V2 to the high pressure source 48 and another state in which it connects its line to a pressure sink, schematically indicated in this drawing by the transmission sump 58. The valve state depends upon two opposed forces acting upon the valve spool due to (1) a solenoid controlled by a pressure demand signal from the transmission's electronic control, EC and (2) a pilot signal taken from the valve's output. Consequently the valve constantly compares its own output pressure to the pressure demand from the EC and adjusts the output pressure to correspond to the pressure demand. Hence the EC has direct control over the pressures $P_{V1}$ and $P_{V2}$ at the valves' outputs.

Under conditions of zero flow between the valves V1, V2 and the pistons 31, pressures $P_{CYL1}$ and $P_{CYL2}$ acting upon the pistons 31 match the valves output pressures $P_{V1}$ and $P_{V2}$. The pressure difference across the variators pistons (which, it will be recalled, determines the variator reaction torque) corresponds to the difference in the two pressure demands from the EC.

However changes in variator ratio are accompanied by movement of the pistons 31 and fluid displaced by the pistons flows through the hydraulic circuit. Suppose that the pistons 31 move from left to right, as viewed in FIG. 2. A volume of fluid is drawn in by the pistons on the SI side of the circuit and an equal volume is expelled by the pistons into the S2 side. This movement of fluid can be thought of as a flow through the variator, represented on the diagram as a flow $Q_V$. In the illustrated example there are six pistons 31 and consequently a flow of $Q_V \div 6$ "through" each piston. The flow $Q_V$ is supplied by the high pressure source 48 via the valve V1 to the S1 side of the pistons 31 and is exhausted to the pressure sink via valve V2.

In any hydraulic circuit there is a resistance to flow of fluid and consequently a pressure drop along the direction of flow. In fact in the illustrated circuit, dampers are incorporated whose purpose is to create a pressure drop along the flow direction in response to fluid flow, thereby to damp oscillatory behaviour of the variator pistons 31 and rollers 28. Main dampers 60, 62 are provided in the flow lines S1, S2, between the pistons 31 and the valves V1, V2, and serve to damp oscillation of the pistons in unison with each other. Roller dampers 64, 66, 64', 66', 64", 66", 64''', 66''', 64'''', 66'''', 64''''', and 66''''' in branch lines leading to the individual pistons 31, 31', 31", 31''', 31'''', and 31''''' serve to damp any tendency for the pistons to oscillate out of phase with each other. The dampers may be formed as simple orifices in the lines, although they may take other forms.

In the case of rightward motion of the pistons, the effect of pressure drops in the circuit while fluid flows is that pressure $P_{CYL1}$ is less than $P_{V1}$ and $P_{CYL2}$ is greater than $P_{V2}$ (these inequalities would be reversed if the motion were to the left). The pressure difference $\Delta P_{CYL}$ across the pistons 31 is less than the pressure difference demanded of the two valves $V_1$, $V_2$ by the sum of the pressure drops across all restrictions in the circuit. Pressures $P_{CYL1}$, $P_{CYL2}$, $P_{CYL1'}$, $P_{CYL2'}$, $P_{CYL1''}$, $P_{CYL2''}$, $P_{CYL1'''}$, $P_{CYL2'''}$, $P_{CYL1''''}$, $P_{CYL2''''}$, $P_{CYL1'''''}$, and $P_{CYL2'''''}$ are shown in FIG. 2.

To summarise so far, changes in variator ratio produce fluid flow. Flow produces a pressure drop along the flow direction and so causes the pressure difference on the pistons to differ from the pressure difference set by the EC acting through the valves $V_1$, $V_2$. Since piston pressure difference is proportional to variator reaction torque the result will, unless compensation is provided, be an error in reaction torque.

The problem is solved, by virtue of the present invention, by applying suitable compensation to the pressure demands controlling the valves $V_1$ and $V_2$. By way of example, suppose that the instantaneous flow $Q_V$ in the FIG. 2 circuit results in a pressure drop of $$P_{V1} - P_{CYL1} = P_{LOSS}.$$

At the same time, an increase takes place in $P_{CYL2}$. If we take it that the loss in $P_{CYL1}$ is equal to the increase in $P_{CYL2}$ (although this simplification is not required) then $$\Delta P_{CYL} = \Delta P_{REQ} - 2P_{LOSS}$$

where $\Delta P_{REQ}$ is the difference demanded by the EC in the pressures output from the valves $V_1$, $V_2$. To compensate, $\Delta P_{REQ}$ can be corrected to $\Delta P^1_{REQ}$ where $$\Delta P^1_{REQ} \Delta P_{REQ} + 2P_{LOSS}$$

This compensation can be achieved by increasing the pressure demand on $V_1$, by decreasing the demand on $V_2$, or by a combination of both. Calculation of the necessary compensation is thus straightforward if $P_{LOSS}$ can be suitably determined. $P_{LOSS}$ can in principle be determined since the rate of movement of the variator pistons, and the consequent flow $Q_V$ in the hydraulics, are a function of the variator ratio and the rate of change of variator ratio. This relationship depends upon the construction and geometry of the variator itself. From $Q_V$, it is possible, taking account of the characteristics of the hydraulic circuit and the hydraulic fluid, to calculate the pressure change $P_{LOSS}$.

The time history provided in FIG. 3 serves to illustrate how $P_{LOSS}$ relates to variator ratio, and indeed to vehicle and engine speed. It represents changes as a vehicle accelerates from a standing start at time $t_0$. FIG. 3 (*b*) shows that in this example desired vehicle acceleration is constant, until time $t_1$, and vehicle speed $V_S$ over this time is thus a straight line. The desired engine speed $E_S$ can be seen in FIG. 3(a) to be constant. In this respect the example is somewhat simplified, since the desired engine speed would more typically change over time. FIG. 3 (c) shows the necessary profile of variator ratio $R_V$. Of course since the vehicle is accelerating while the engine speed remains constant, the transmission as a whole must move from a low ratio to a higher ratio between times $t_0$ and $t_1$. In fact in the illustrated example the transmission is at an infinitely low ratio up to time $t_0$, a condition referred to in the art as "geared neutral". Looking at FIG. 3 (c) it can be seen that in order to provide the required linear increase in the ratio from the transmission as a whole, the ratio of the variator itself firstly decreases linearly, up until time $t_{TC}$, and then increases linearly. This is because the transmission in question is of the well known type operable in two different regimes, provided by virtue of intermediate gearing through which the variator couples to the engine and/or the driven wheels. In low regime a decrease in variator ratio causes an increase in ratio of the transmission as a whole. In high regime an increase in variator ratio increases overall transmission ratio. At $t_{TC}$ a regime change, from low to high, takes place. Moving from geared neutral all the way to the transmission's highest ratio thus involves sweeping the variator through its entire ratio range, and then back again, as represented in FIG. 3 (c). FIG. 3 (d) is a simplified representation of the corresponding flow $Q_V$, obtainable from the profile of variator ratio $R_V$. FIG. 3 (e) represents the resultant pressure drop $P_{LOSS}$ and can be found from the profile of $Q_V$, taking account of characteristics of the hydraulics and the fluid.

If compensation for pressure losses due to flow were to be based upon a measured value for the rate of change of variator ratio then stability of the variator could potentially be compromised. Pressure drops created by the hydraulic dampers are desirable in preventing oscillation of the variator. The effects of the hydraulic dampers could be affected, and indeed if the hydraulic control were of a high enough bandwidth the dampers' effects could be altogether negated. Further, the effect of compensation based upon measured rate of change of variator ratio could be to amplify oscillation in the drive line, unwanted changes in variator ratio due to such oscillation causing compensatory changes in hydraulic pressure which tend to amplify the ratio change, rather than to damp it.

What the present embodiment does in order to overcome this potential problem is in essence to base the pressure compensation not upon measured changes in variator ratio but upon a predicted change—a feed forward, as opposed to feedback, technique. The result is that damping of variator oscillation is maintained. In existing systems the effect of damping is to provide some resistance to variator ratio change. That is, the damping tends to arrest ratio changes. In the embodiment under consideration, the combined effect of the pressure compensation and the hydraulic dampers 60,62 is instead to tend to damp oscillation of the variator ratio about a predicted trajectory—i.e. a predicted profile of variator ratio over time. How this is achieved will be explained below.

In the present embodiment pressure compensation is based upon values of variator ratio and of rate of change of variator ratio obtained from (1) engine speed/acceleration and (2) vehicle speed/acceleration. Engine acceleration is proportional to the rate of change of variator input speed. Vehicle acceleration is proportional to the rate of change of variator output speed (although the constant of proportionality depends upon the transmission regime), at least while the driven wheels maintain traction upon the road. Hence the chosen quantities allow both variator ratio and the rate of change of variator ratio to be determined.

The profile of engine speed over time is controlled by the EC. For a detailed explanation of how this is achieved, reference is directed to Torotrak's UK patent application GB 0307038.0, filed Mar. 27, 2003. Briefly, however, the EC determines a desired wheel torque based upon driver demand (communicated through the accelerator pedal), vehicle speed etc. From desired wheel torque a desired engine power can be found, and based on this the EC sets desired engine speed and engine torque. The desired engine speed and torque can for example be set to achieve high fuel efficiency, based upon known engine characteristics and upon the power required to meet the driver's demand. To achieve the desired engine speed it is necessary to dynamically balance the torque created by combustion within the engine against the loading torque applied by the transmission to the engine, since it is the sum of these two torques which acts upon the inertia of the engine (and of coupled parts of the transmission) and causes acceleration thereof. This balance is controlled by adjustment of the torque demand applied to the engine controller and if necessary of the variator reaction torque. What the EC does is to determine a target profile of engine speed and to determine appropriate settings of reaction torque demand and engine torque demand. To control deviations of the engine speed from the target profile, the actual engine speed is subsequently compared against a predicted engine speed calculated from models of the engine and transmission's responses to their control inputs. The engine torque demand (and if necessary also the reaction torque) is corrected to reduce deviations between the actual and predicted speeds. This in itself a "feed forward" technique since corrections to the actual engine speed are based upon a predicted value of engine speed. The important point for present purposes is that the EC forms predictions of the engine speed, and correspondingly of the engine acceleration.

Turning now to the determination of a value of vehicle acceleration for use in pressure compensation, it should firstly be understood that this poses problems different from those associated with engine speed. Whereas engine speed is determined by factors under the control of the EC (the engine torque and the reaction torque), vehicle acceleration is dependent upon external-factors—gradient, vehicle mass, drag etc.—not directly controlled by the system. Accurate determination of vehicle acceleration (and speed) are an important part of the determination of variator ratio and of rate of change of variator ratio. A value can of course be obtained by measurement (e.g. of wheel speed) but unfortunately the vehicle (due to its suspension etc.) and the drive line (due to its compliance) have dynamics exhibiting resonance at frequencies as low as 2 Hz in motor cars and still lower in larger vehicles. If not filtered out, this oscillation would produce undesirable low frequency oscillation in the measured vehicle speed and hence in the calculated value of variator ratio. The oscillation would be reflected in the pressure compensation applied to the demands upon valves $V_1$, $V_2$. In this way the oscillation would in turn influence variator reaction torque and hence vehicle acceleration, with the potential for damaging positive feedback. This would be a particular problem at very low transmission ratios, close to geared neutral, where errors in the variator pressure demand potentially produce large errors in torque at the driven wheels.

A simple low pass filter could be applied to the vehicle speed measurement but given the low frequency of the noise, the filter would necessarily have a long time constant and hence introduce an unacceptable lag between actual and measured/filtered vehicle speed values.

Figure 4:
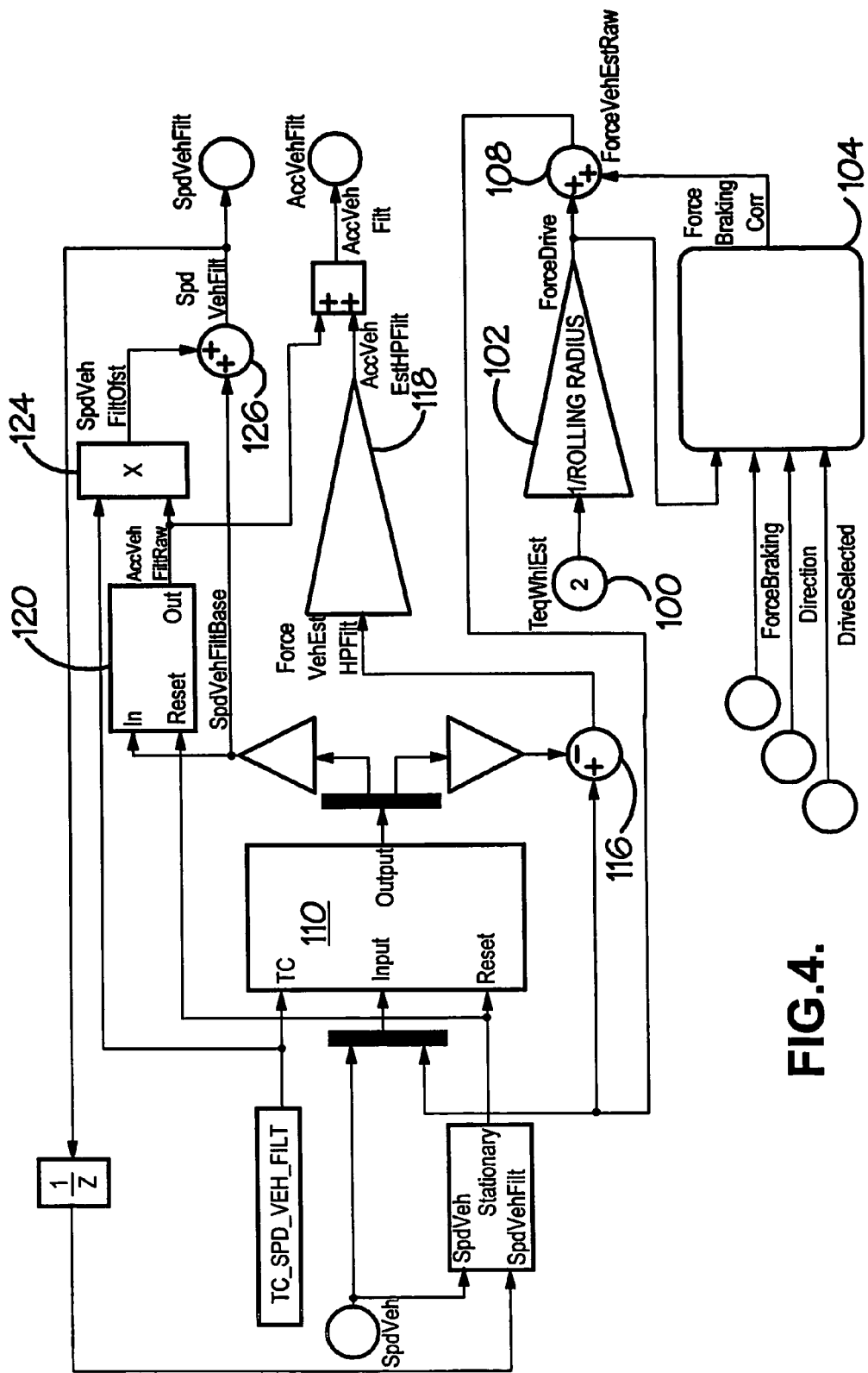
FIG. 4 is a block diagram of a filtering strategy used in an embodiment of the present invention.
Figure 5:
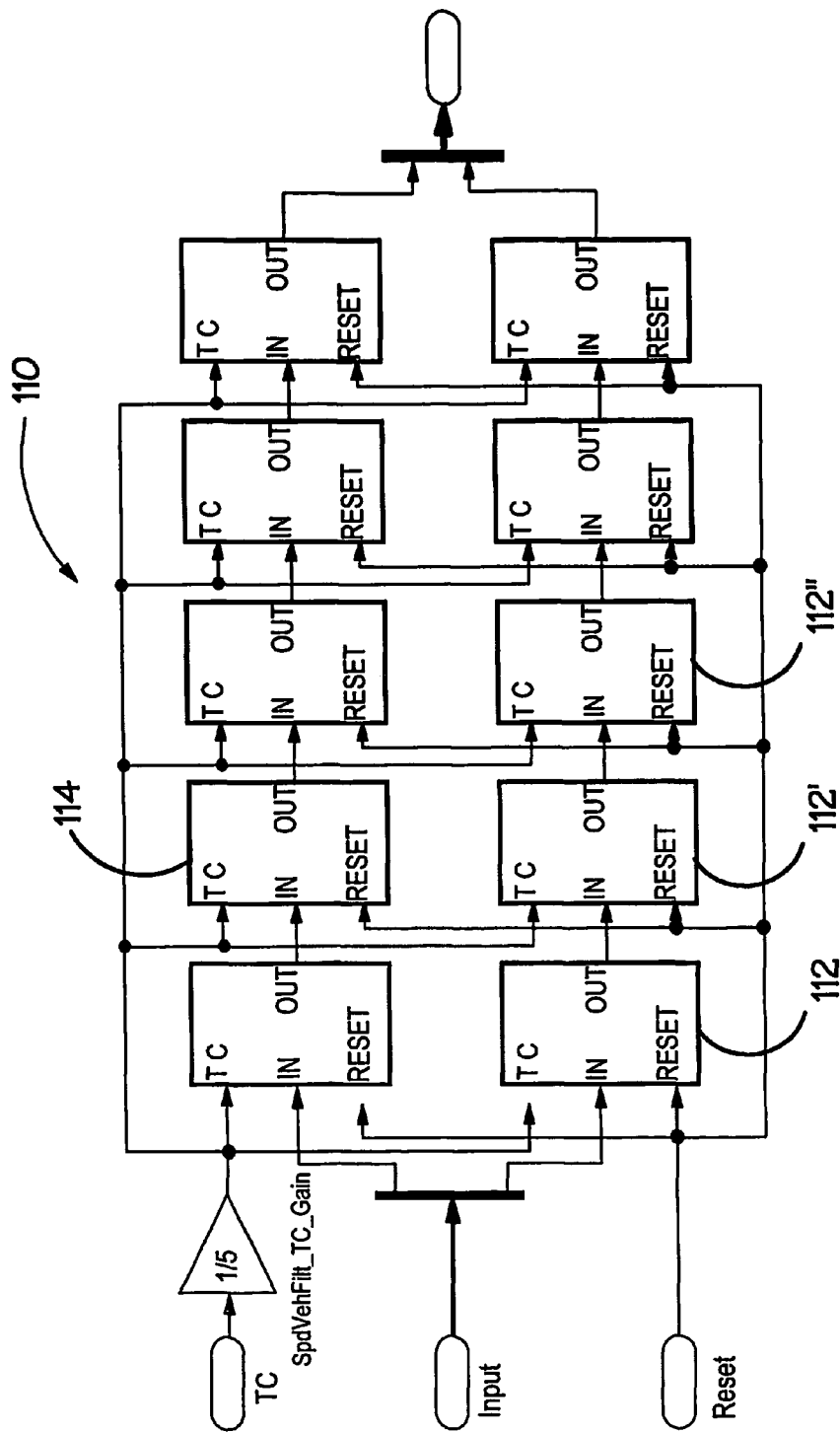
FIG. 5 is a block diagram of a filter used in the same strategy.

The filter now to be described with reference to FIGS. 4 and 5 allows these problems to be overcome. It relies on a combination of measured and predicted vehicle speed values. The strategy is illustrated in FIG. 4. It produces filtered values of both vehicle speed (SpdVehFilt) and vehicle acceleration (AccVehFilt) but the calculation of the latter will be considered first of all.

In FIG. 4 TrqWhlEst, input at box 100, represents an estimated, unfiltered value of driving torque applied to the driven vehicle wheels, typically obtained from dividing this torque by the rolling radius of the vehicle driven wheels at 12 gives a value for the force applied by the powertrain to accelerate the vehicle (ForceDrive). To allow for the additional force applied by the brakes, the brake pressure is measured and braking force (ForceBraking in FIG. 1) is then calculated based upon the pressure/force characteristics of the brakes. The relationship between brake pressure and brake force is essentially linear, so that this is a straightforward calculation. The function labelled 14 in FIG. 1 receives ForceBraking and ForceDrive, as well as indications of direction of vehicle travel (forward/reverse) and of the position of the vehicle drive control, and in dependence upon these outputs a corrected value ForceBrakingCorr of the brake force. Adding this at 18 to ForceDrive gives an unfiltered signal ForceVehEstRaw representing the net driving force being applied by engine and brakes to accelerate the vehicle.

This signal ForceVehEstRaw is passed to a multiple order filter 20, which is seen in more detail in FIG. 2 and comprises a series of low pass, first order, digitally implemented filters 22 for filtering the force values ForceVehEstRaw, as well as a further series of identical filters 24 for filtering a vehicle speed value, as will be explained below. The output of one filter such as 22 is fed to the input of its neighbour 22' and so on in the series, so that together they provide a high order, low pass filter with a relatively sharp frequency cut off and a time constant TC, a common parameter which is input to the filters.

The output from the filter 20 is a low pass filtered, estimated value ForceVehEstFilt (FIG. 1) of the force acting upon the vehicle. At 26 this is taken from the unfiltered value ForceVehEstRaw to provide what is in effect a high pass filtered version ForceVehEstBPFilt. This is then put into an adaptive model 118 of the vehicle The model serves to output a high pass filtered estimate AccVehEstHPFilt of the vehicle acceleration. The simplest possible model would involve only division of the driving force ForceVehEstFilt by the vehicle mass.

For greater accuracy it is necessary to take account of vehicle mass, road gradient, drag and potentially other factors. Mass and gradient are of course variable and are not directly measured. Hence a more sophisticated model is adoptive, making corrections to these variables based upon the vehicle's response.

AccVehEstHPFilt has been obtained based upon the vehicle mass and the force applied to it. Another way to obtain a value for vehicle acceleration is to measure vehicle speed and then differentiate with respect to time. In FIG. 4 the measured vehicle speed, itself a signal which incorporates a good deal of noise, is indicated as SpdVeh and is input to the multiple order filter 110 and specifically to the series of filters 114. The resulting low pass filtered signal is passed to a digital differentiator 120 to provide a low pass filtered estimate AccVehFiltRaw of the vehicle acceleration. At 122 the high pass filtered signal AccVehEstHPFilt is added to the low pass filtered signal AccVehFiltRaw to provide a signal AccVehFilt which is a very close approximation to the true value of the vehicle acceleration, as trials have demonstrated. The low frequency noise due to drive line oscillation has been removed by virtue of the low pass filtering of the measured vehicle speed signal. The time lag introduced by the low pass filter has been corrected by addition of the high pass filtered estimate of acceleration based upon the transmission/brake force.

To now explain how a usable value of vehicle speed is obtained, note that the low pass filtered value of vehicle acceleration AccVehFiltRaw, obtained by differentiation of measured vehicle speed, is led to a multiplier 124 which also receives the time constant TC of the multiple pass filter 110. Multiplying AccVehFiltRaw by TC gives an offset SpdVehFiltOfst which is an estimate of the difference between the actual and filtered values of the vehicle speed introduced due to the time lag from the filter 110. Adding this offset at 126 to the low pass filtered measured vehicle speed signal, SpdVehFiltBase, gives an improved, filtered vehicle speed signal SpdVehFilt.

Figure 6:
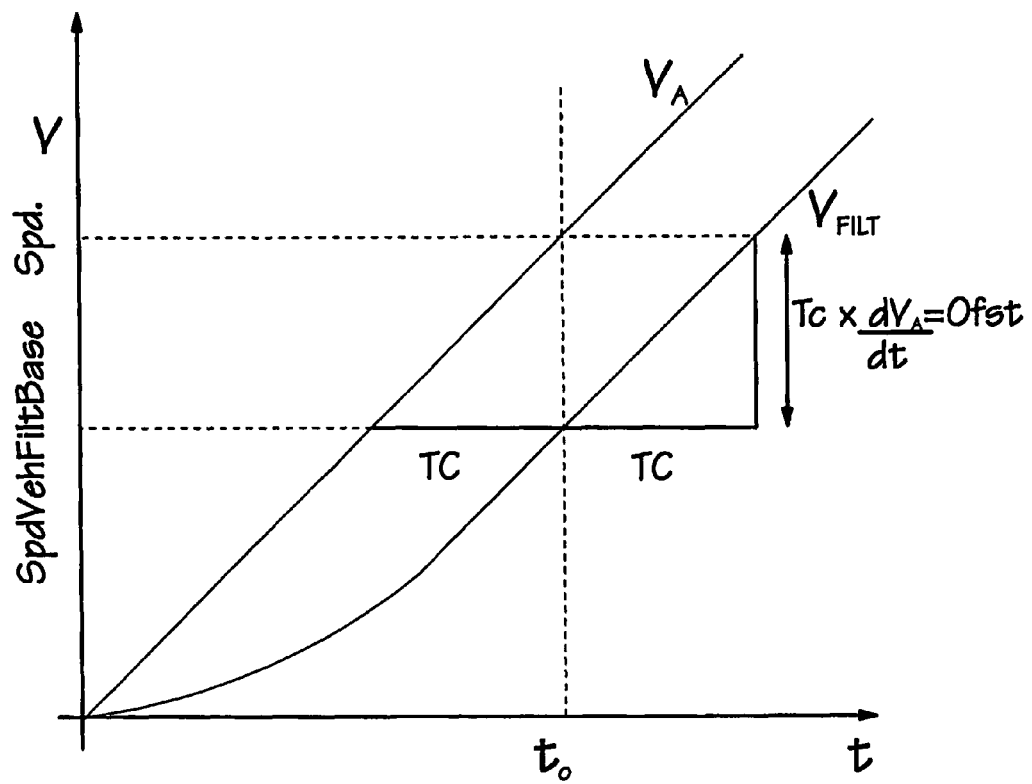
FIG. 6 is a graph showing actual and measured vehicle speed values (vertical axis) against time (horizontal axis)

FIG. 6 is intended to make the significance of the offset SpdVehFiltOfst clear. Line $V_A$ represents actual vehicle speed and in this example is a straight line corresponding to constant vehicle acceleration. There is a time lag, determined by the time constant TC, between the actual speed $V_A$ and the measured filtered signal $V_{FILT}$. Consequently at an arbitrarily chosen point in time, $t_0$, the value SpdVehFiltBase of the filtered signal 202 is different from the actual speed Spd. The difference is in the illustrated example equal to the gradient of the filtered signal 202 multiplied by the time lag TC. Adding the offset SpdVehFiltOfst, calculated in this way, thus gives a value SpdVehFilt which is equal to the true value Spd. The offset is precisely correct in this example only because the vehicle acceleration is constant. If the acceleration varies then there will be some discrepancy between SpdVehFilt and Spd, but the method provides a great improvement over the raw filtered value.

Figure 7:
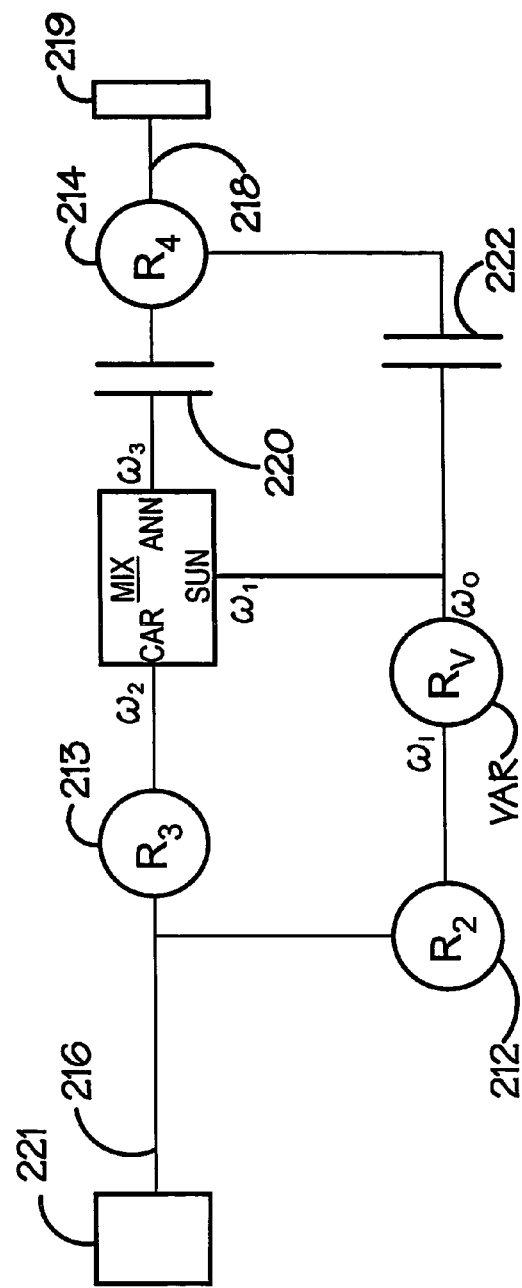
FIG. 7 is a highly schematic representation of a multi-regime transmission of a type which is in itself known but which can be used in embodiments of the present invention.

Having values for vehicle speed and acceleration, as well as engine speed and acceleration, the variator ratio $R_V$ and the rate of change of variator ratio $$\frac{dR_v}{dt}$$

can be found. The relationship between vehicle/engine speeds and variator ratio depends upon diameter of the driven wheels and upon the intermediate gearing associated with the variator. Purely by way of example, in order to illustrate the principles involved in the calculation, FIG. 7 provides a schematic representation of a vehicle drive line of a known type having an epicyclic mixer MIX as well as the variator VAR. Further gearing is indicated at 212, 213 and 214, having ratios $R_2$, $R_3$ and $R_4$ respectively. Rotational speeds at the mixer's three shafts are designated $\omega_1$, $\omega_2$, and $\omega_3$. Shaft 216 leads to the engine and rotates at the engine speed SpdEng. Shaft 218 leads to the driven vehicle wheels 219. The engine is indicated at 221. A clutch 220 is closed to engage low regime, in which drive is taken from the epicyclic mixer. Opening the low regime clutch and closing a high regime clutch 222 engages high regime, in which the mixer is essentially circumvented and a gear chain with fixed ratio connects the variator output to the wheels.

Now, if $\omega_o$ and $\omega_i$ are the variator's input and output speeds then by definition $$R_V = \frac{\omega_o}{\omega_i}$$

and in high regime $\omega_o$=SpdVehFilt/$R_4$/$R_{FD}$/driven wheel circumference.

where $R_{FD}$ is the final drive ratio between the transmission output and the driven wheels, and $\omega_i$=SpdEng×$R_2$ so $R_V$ can be found. Also $$\omega_o = R_V \omega_i$$

and differentiating by parts $$\frac{d\omega_o}{dt} = R_V \frac{d\omega_i}{dt} + \frac{dR_V}{dt}\omega_i \quad (1)$$

so $$\frac{dR_V}{dt} = \left(\frac{d\omega_o}{dt} - R_V \frac{d\omega_i}{dt}\right) \div \omega_i$$

And a value can be obtained for $$\frac{dR_V}{dt}$$

since $$\frac{d\omega_i}{dt} = AccEngEst \times R_2$$

where AccEngEst is the expected acceleration engine speed taken from the electronic control's engine management strategy and $$\frac{d\omega_o}{dt} = AccVehFilt/R_4/R_{FD}/\text{driven wheel circumference}$$

so all of the quantities on the right hand side of (1) can be given values. The calculation of $$\frac{dR_V}{dt}$$

in low regime is a little more complex. Take $R_{13}$ to be the ratio between the speeds $\omega_1$ and $\omega_3$ at the epicyclic mixer. The mixer is constructed such that $$R_{13} = \frac{\omega_3 - \omega_2}{\omega_1 - \omega_2} \quad (2)$$

so $$\omega_3 = R_{13}\omega_1 + (1 - R_{13})\omega_2$$

and $$\frac{d\omega_3}{dt} = R_{13}\frac{d\omega_1}{dt} + (1 - R_{13})\frac{d\omega_2}{dt}$$

From (2)

$$\frac{\frac{d\omega_3}{dt} - (1 - R_{13})\frac{d\omega_2}{dt}}{R_{13}} = \frac{d\omega_1}{dt} = \frac{d\omega_0}{dt}$$

substituting in (1), $$\frac{dR_V}{dt} = \frac{1}{\omega_1 R_{13}}\left(\frac{d\omega_3}{dt} - (1 - R_{13})\frac{d\omega_2}{dt}\right) - \frac{R_V}{\omega_i}\frac{d\omega_i}{dt}$$

and again this can be evaluated taking account that $$\frac{d\omega_2}{dt} = AccEngEst \times R_3$$

and $$\frac{d\omega_3}{dt} = AccVehFilt/R_4/R_{FD}/\text{driven wheel circumference}$$

Figure 8:
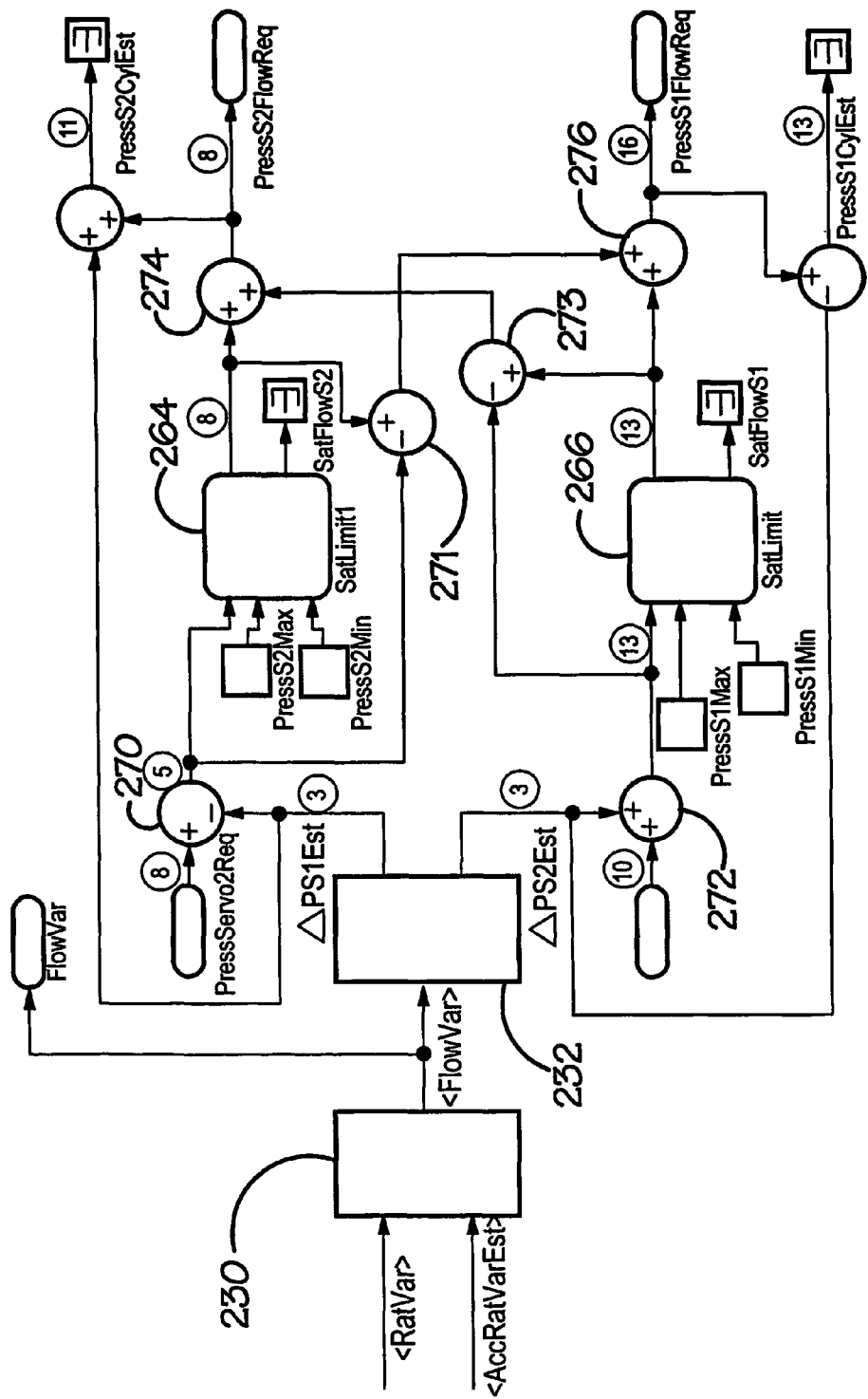
FIG. 8 is a block diagram of an overall strategy, in accordance with the invention, for control of pressures in a variator control circuit.

FIG. 8 illustrates how, based upon the values for variator ratio and rate of change thereof, the pressure demands to valves $V_1$, $V_2$ are controlled. Here, the measured value of the variator ratio $R_V$ (obtained by measuring variator input and output speeds and filtering) is represented by the variable RatVar and the estimated rate of change of variator ratio is the variable AccRatVarEst. These quantities are found from the formulae above. From these quantities, the resulting flow FlowVar through the variator cylinders is calculated at 230. This calculation is based upon the variator geometry. It can be shown that for the variator illustrated in FIG. 1:

$$\frac{dx}{dt} = R_T \frac{d\alpha}{dt}\tan\beta$$

where x=piston position
$R_T$=the radius of the centre line of the torus defined by the variator discs
$\alpha$=roller tilt angle
$\beta$=variator castor angle, marked on FIG. 1
and $$\frac{d\alpha}{dt}$$

d$\alpha$ can be found from the ratio $R_V$ and its first differential since $$\frac{d\alpha}{dt} = \frac{2K_c \frac{dR_v}{dt}}{(R_v - 1)^2}$$

where $$K_c = \frac{R_T}{R_R}$$

and $R_R$ = variator roller radius.

Hence $$\frac{dx}{dt},$$

the speed of movement of the variator pistons, can be found from measured values of variator ratio and its first time differential and from this, knowing the piston areas, the flow rate "across" the variator can be determined.

Figure 9:
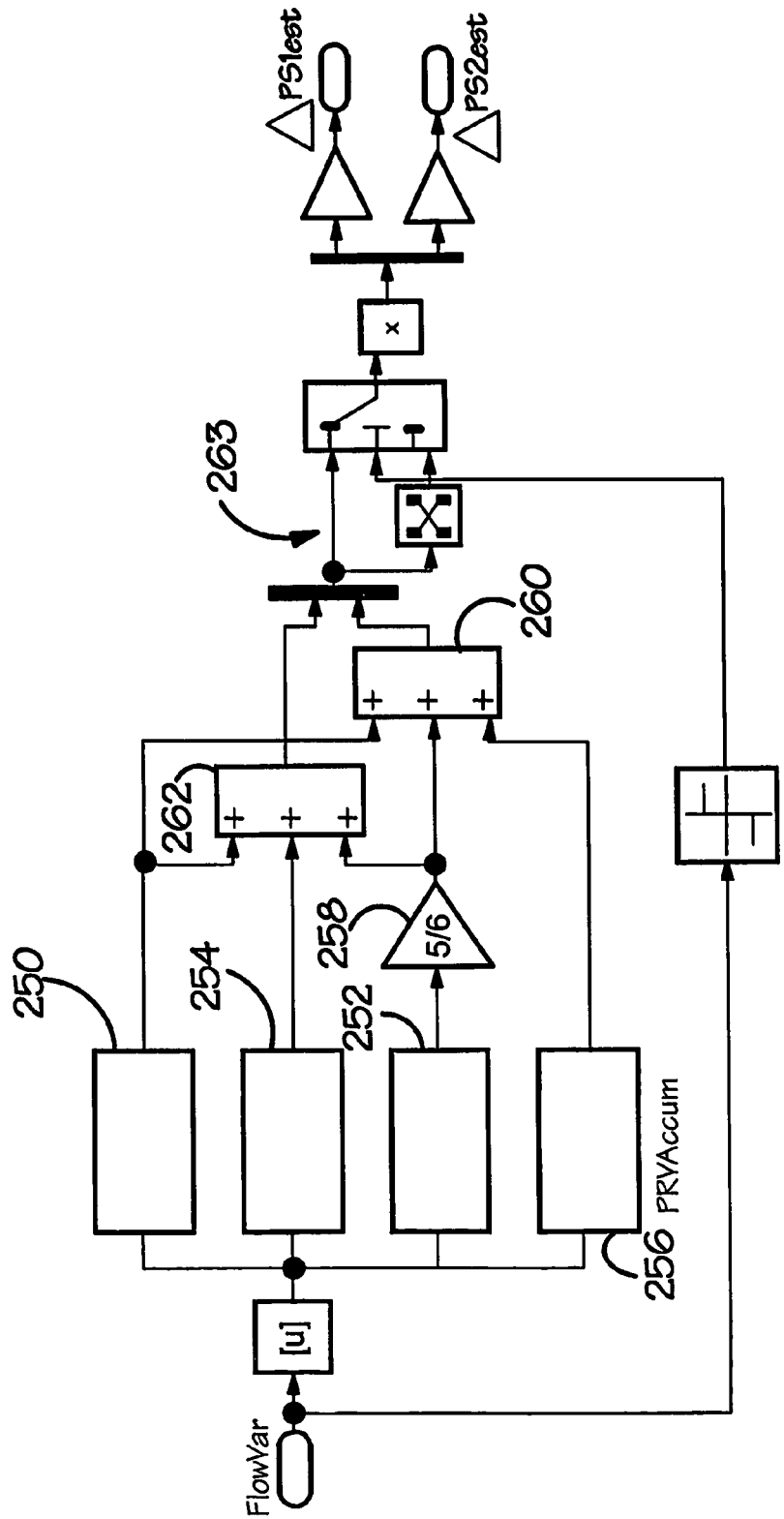
FIG. 9 is a block diagram illustrating how a pressure drop in the variator control circuit is calculated.

At 232 the resulting pressure changes $\Delta PS2_{est}$ and $\Delta PS1_{est}$ on the opposite sides of the variator pistons are calculated. FIG. 9 illustrates how this calculation is carried out. Look up tables are utilized which represent the characteristics of those components of the circuit whose resistance to flow causes pressure drop—i.e. the pressure change each creates as a function of flow through it. The characteristics can be established by experiment. The assumption is made that the main dampers 60, 62 and the roller dampers 64, 66 create the same magnitude of pressure drop regardless of flow direction (although of course the direction of the pressure drop corresponds to the flow direction). Their characteristics are stored in look up tables 250, 252 respectively. Allowance is also made for the characteristics of the valves $V_1$, $V_2$ but since those have different characteristics in respect of forward and backward flow, two separate look up tables 254, 256 are used to represent the valves.

An absolute value of FlowVar is input to all of the look up tables and values are output for the resulting pressure drop contributed by each of the circuit components. The pressure drop across the roller dampers is multiplied by a constant at 258 to take account of the fact that not all of the pistons have associated dampers. The sum of the pressure changes in the in-flow and out-flow sides of the circuit are calculated respectively at 260 and 262 and crossover logic 263, taking account of the sign of FlowVar, ensures that these are correctly attributed to the S1 and S2 lines to produce the outputs $\Delta PS2_{est}$ and $\Delta PS1_{est}$.

Turning back to FIG. 8, the flow compensation strategy is perhaps best explained with reference to a numerical example. It receives PressServo1Req and PressServo2Req, which are the pressures required at the variator pistons. In the drawing the numbers shown in circles correspond to pressures, so in this example PressServo2Req is 8 (the units are arbitrary) and PressServo1Req is 10. The required pressure difference across the variator pistons, which is the quantity that determines variator reaction torque, is 10−8=2. At 270, 272 the pressure changes $\Delta PS1_{est}$ and $\Delta PS2_{est}$ are respectively added and taken away from the required pressures. The resulting pressure may however lie above or below those which can be provided. They are output to limiters 264, 266 which also receive parameters representing the maximum and minimum available hydraulic pressures. In this case the pressure of 5 units input to the $S_2$-side limiter 264 is below the lowest available pressure of 8 units. That limiter thus outputs a value of 8. The $S_1$-side limiter outputs the same value (13) that it receives, since this is within the available range. At 271 and 273 the input to the respective limiters are taken away from their outputs. The result, which is the difference between the required pressure and the available pressure, is then added at 274, 276 to the pressure demand on the other side of the circuit, to give the demands PressS1FlowReq and PressS2FlowReq to be passed on to the valves $V_1$, $V_2$.

The invention claimed is:

1. A continuously variable ratio transmission assembly ("variator") comprising:
   a roller configured to transmit drive between a pair of races, the roller being movable in accordance with changes in a variator ratio,
   a hydraulic actuator configured to apply a biasing force to the roller, at least one valve connected to the actuator through a hydraulic line to control pressure applied to the actuator and so to control the biasing force, and
   an electronic control configured to determine the required biasing force and configured to set the at least one valve accordingly, wherein the electronic control is configured to determine a predicted rate of flow in the hydraulic line based at least on a variator ratio and a rate of change of the variator ratio, to determine a consequent pressure change between the actuator and the valve based at least on the variator ratio and the rate of change of the variator ratio, and to adjust the valve setting to compensate for the pressure change and damp oscillation of the roller.

2. The continuously variable ratio transmission assembly as claimed in claim 1 wherein the electronic control is configured to calculate the pressure change from the rate of flow and characteristics of one or more components of the hydraulic line.

3. The continuously variable ratio transmission assembly as claimed in claim 2 wherein the component characteristics are modelled in the electronic control.

4. The continuously variable ratio transmission assembly as claimed in claim 1 wherein the electronic control is configured to determine the predicted rate of flow from the variator ratio and a rate of change of the variator ratio.

5. The continuously variable ratio transmission assembly as claimed in claim 1 wherein, in calculating the predicted rate of flow, the electronic control is configured to take account of predicted values of engine speed and engine acceleration.

6. The continuously variable ratio transmission assembly as claimed in claim 5 wherein the hydraulic line incorporates at least one component serving to create a pressure change in response to flow and thereby to damp oscillation of the variator roller, wherein by virtue of the compensation to the valve setting based upon predicted engine acceleration the effect of the valve and the component together is to damp deviations of roller position from those corresponding to the predicted engine acceleration.

7. The continuously variable ratio transmission assembly as claimed in claim 1 wherein, in calculating the predicted rate of flow, the electronic control is configured to take account of vehicle speed and vehicle acceleration.

8. The continuously variable ratio transmission assembly as claimed in claim 7 wherein, in determining the value of vehicle acceleration used in calculating the predicted rate of flow, the electronic control is configured to take account of net force applied to drive the vehicle.

9. The continuously variable ratio transmission assembly as claimed in claim 8 wherein net force applied to drive the vehicle is used to obtain a first vehicle acceleration signal which is high pass filtered, measurement of vehicle speed or acceleration is used to obtain a second vehicle acceleration signal which is low pass filtered, and the first and second signals are then added together to provide an improved vehicle acceleration signal used in calculating the predicted rate of flow.

10. The continuously variable ratio transmission assembly as claimed in claim 7 wherein a measured vehicle speed signal is low pass filtered and an offset is added to the filtered signal to compensate for time lag caused by the filtering.

11. The continuously variable ratio transmission assembly as claimed in claim 10 wherein the offset is calculated by multiplying the differential of the filtered signal by a time constant.

12. The continuously variable ratio transmission assembly as claimed in claim 1 wherein the valve is a pressure reducing valve configured to receive high pressure fluid and configured to apply a fluid pressure to the hydraulic line, the fluid pressure corresponding to the valve setting.

13. The continuously variable ratio transmission assembly as claimed in claim 1 comprising two hydraulic lines each with a respective valve for control of pressure, the hydraulic lines being led to opposite sides of a piston in the actuator so that the biasing force depends upon a difference in pressures from the two lines.

14. The continuously variable ratio transmission assembly as claimed in claim 1 wherein the electronic control is configured to calculate the pressure change from at least one of:
   the rate of fluid viscosity of the hydraulic line; and
   the rate of fluid temperature of the hydraulic line.

15. The continuously variable ratio transmission assembly as claimed in claim 1 wherein the at least one valve set by the electronic control comprises not more than one valve.

* * * * *